(12) United States Patent
White

(10) Patent No.: US 8,853,878 B1
(45) Date of Patent: Oct. 7, 2014

(54) GAS TURBINE ENGINE WITH MULTIPLE LOAD OUTPUTS

(71) Applicant: Solar Turbines Incorporated, San Diego, CA (US)

(72) Inventor: Robert Chappell White, San Diego, CA (US)

(73) Assignee: Solar Turbines Inc., San Diego, CA (US)

( * ) Notice: Subject to any disclaimer, the term of this patent is extended or adjusted under 35 U.S.C. 154(b) by 0 days.

(21) Appl. No.: 13/893,908

(22) Filed: May 14, 2013

(51) Int. Cl.
*F01D 15/10* (2006.01)

(52) U.S. Cl.
USPC ............................................. 290/52; 290/54

(58) Field of Classification Search
USPC ........................................ 290/52, 54; 60/772
See application file for complete search history.

(56) References Cited

U.S. PATENT DOCUMENTS

| | | | |
|---|---|---|---|
| 5,689,141 A | 11/1997 | Kikkawa et al. | |
| 6,467,725 B1 * | 10/2002 | Coles et al. | 244/58 |
| 6,870,279 B2 * | 3/2005 | Gilbreth et al. | 290/52 |
| 6,895,741 B2 * | 5/2005 | Rago et al. | 60/226.1 |
| 7,514,810 B2 * | 4/2009 | Kern et al. | 290/52 |
| 7,526,926 B2 | 5/2009 | Rasmussen et al. | |
| 8,198,744 B2 * | 6/2012 | Kern et al. | 290/52 |

* cited by examiner

*Primary Examiner* — Nicholas Ponomarenko
(74) *Attorney, Agent, or Firm* — Procopio, Cory, Hargreaves & Savitch LLP

(57) ABSTRACT

A gas turbine engine includes a compressor, a combustor, a turbine, a power turbine shaft, and a gas producer shaft. The compressor includes a compressor rotor assembly including a plurality of compressor disk assemblies. The turbine includes a turbine rotor assembly including a power turbine section and a gas producer section. The power turbine shaft is coupled to the power turbine section and is configured to couple to a first driven apparatus. The gas producer shaft is coupled to the gas producer section and the compressor rotor assembly, and is configured to couple to a second driven apparatus.

20 Claims, 2 Drawing Sheets

GAS TURBINE ENGINE WITH MULTIPLE LOAD OUTPUTS

TECHNICAL FIELD

The present disclosure generally pertains to gas turbine engines, and is more particularly directed toward a gas turbine engine configured with multiple load outputs.

BACKGROUND

Gas turbine engines include compressor, combustor, and turbine sections. The rotational power generated by the turbine is delivered to driven equipment, such as electric generators and gas compressors, through an output shaft. One such gas turbine engine is discussed in U.S. Pat. No. 7,526,926 that discloses a drive system for a refrigeration compressor such as is used in a natural gas liquefaction plant, allowing the desired compressor speed and maximum turbine efficiency to be maintained throughout varying ambient temperature conditions. A gas turbine is used with an electric starter motor with drive-through capability located on a common drive shaft between the turbine and the compressor. A variable frequency drive is connected between the electrical power grid and the electric motor for smooth startups, but also to allow excess turbine mechanical power to be converted to electrical power by the motor operating as a generator, and delivered to the grid at the grid frequency.

The present disclosure is directed toward overcoming one or more of the problems discovered by the inventors.

SUMMARY OF THE DISCLOSURE

A gas turbine engine is disclosed. A gas turbine engine includes a compressor, a combustor, a turbine, a power turbine shaft, and a gas producer shaft. The compressor includes a compressor rotor assembly including a plurality of compressor disk assemblies. The combustor is adjacent the compressor. The turbine is adjacent the combustor. The turbine includes a turbine rotor assembly including a power turbine section with a first turbine disk assembly, and a gas producer section with a second turbine disk assembly. The power turbine shaft is coupled to the power turbine section and is configured to couple to a first driven apparatus. The gas producer shaft is coupled to the gas producer section and the compressor rotor assembly, and is configured to couple to a second driven apparatus.

A method for operating the gas turbine engine including an inlet end, a compressor including a compressor rotor assembly with a plurality of compressor disk assemblies adjacent the inlet end, a combustor adjacent the compressor, a turbine including a turbine rotor assembly with a plurality of turbine disk assemblies adjacent the combustor, an exhaust end adjacent the turbine, a first shaft end adjacent the exhaust end and coupled to at least one of the plurality of turbine disk assemblies and a first driven apparatus, and a second shaft end adjacent the inlet end and coupled to the compressor rotor assembly, at least one of the plurality of turbine disk assemblies, and a second driven apparatus, the first shaft end and the second shaft end being located at opposite ends of the gas turbine engine is also disclosed. The method includes driving the first driven apparatus and the second apparatus concurrently with the gas turbine engine at a full load. The method also includes increasing the load output to the second driven apparatus connected to the second shaft end when the load output to the first driven apparatus coupled to the first shaft end is decreased to maintain the gas turbine engine output at the full load. The method further includes decreasing the load output to the second driven apparatus when the load output to the first driven apparatus is increased to maintain the gas turbine output at the full load.

DETAILED DESCRIPTION

The systems and methods disclosed herein include a gas turbine engine with multiple load outputs. In embodiments, the gas turbine engine includes a power turbine shaft coupled to a first driven apparatus such as a gas compressor and a gas producer shaft coupled to a second driven apparatus at opposite ends of the gas turbine engine. The load of the second driven apparatus is either increased or decreased to maintain a full load on the gas turbine engine when the load of the first driven apparatus is decreased or increased respectively. Maintaining a full load on the gas turbine engine may allow for a more efficient operation of the gas turbine engine and may result in fewer emissions produced by the gas turbine engine.

Figure 1:
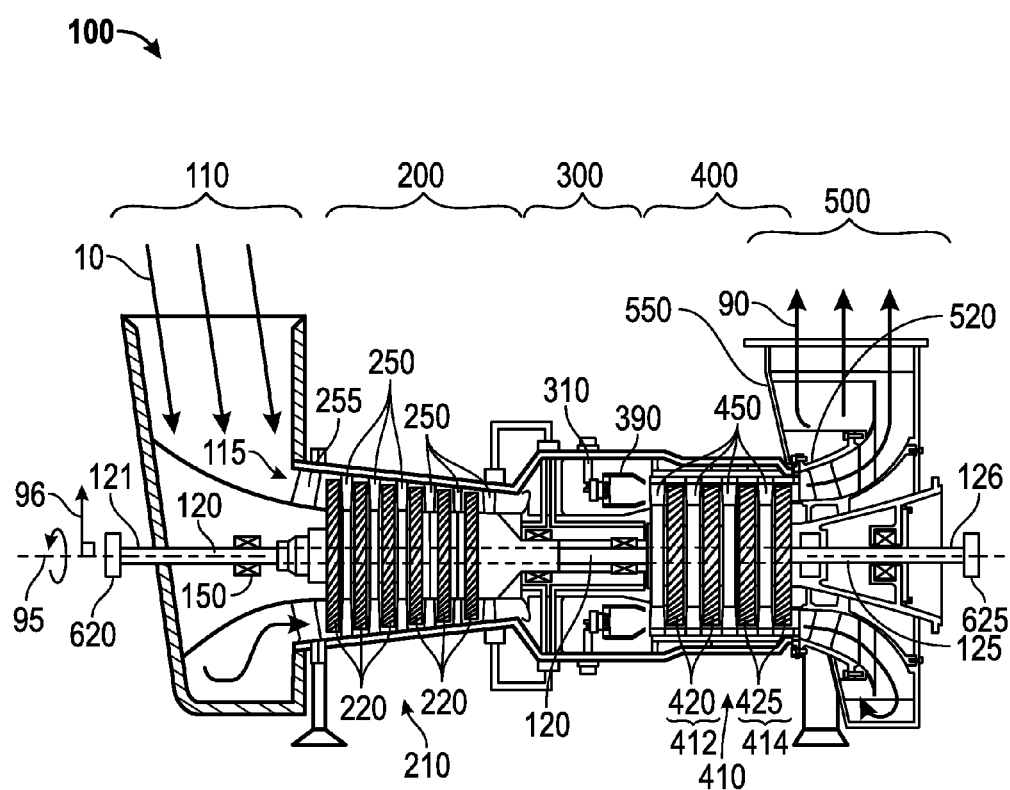
FIG. 1 is a schematic illustration of an exemplary gas turbine engine configured with multiple load outputs.

FIG. 1 is a schematic illustration of an exemplary gas turbine engine 100 configured with multiple load outputs. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft or shafts (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

Gas turbine engine 100 includes an inlet end 110, a compressor 200, a combustor 300, a turbine 400, and an exhaust end 500. The compressor 200 includes a compressor rotor assembly 210, compressor stationary vanes ("stators") 250, and inlet guide vanes 255. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the compressor stages.

The combustor 300 includes one or more fuel injectors 310 and includes one or more combustion chambers 390. The fuel injectors 310 may be annularly arranged about center axis 95.

The turbine 400 includes a turbine rotor assembly 410, and turbine nozzles 450. As illustrated, the turbine rotor assembly 410 is an axial flow rotor assembly. The turbine rotor assembly 410 may be a single section or may be sub-divided into multiple sections. In the embodiment illustrated, the turbine rotor assembly 410 is sub-divided into a gas producer section 412 and a power turbine section 414.

The turbine rotor assembly 410 may include first turbine disk assemblies 425 and second turbine disk assemblies 420. First turbine disk assemblies 425 and second turbine disk assemblies 420 each include a turbine disk that is circumferentially populated with turbine blades. In the embodiment illustrated, gas producer section 412 includes second turbine disk assemblies 420 and power turbine section 414 includes first turbine disk assemblies 425. Turbine nozzles 450 axially precede each of the turbine disk assemblies 420 and 425. Each turbine disk assembly paired with the adjacent turbine nozzles 450 that precede the turbine disk assembly is considered a turbine stage. Turbine 400 includes multiple turbine stages.

The exhaust end 500 includes an exhaust diffuser 520 and an exhaust collector 550.

Gas turbine engine 100 may include a dual shaft configuration with a gas producer shaft 120 and a power turbine shaft 125. The gas producer shaft 120 mechanically couples to compressor rotor assembly 210 and to gas producer section 412, and extends out of one side of gas turbine engine 100. The Power turbine shaft 125 couples to power turbine section 414 and extends out of the side of gas turbine engine opposite the side that gas producer shaft 120 extends out of.

Gas turbine engine 100 also includes a first shaft end 126 and a second shaft end 121. First shaft end 126 may be the end of power turbine shaft 125 opposite the end connected to power turbine section 414 and second shaft end 121 may be the end of gas producer shaft 120 opposite the end connected to gas producer section 412. The first shaft end 126 and the second shaft end 121 are located at opposite ends of gas turbine engine 100. First shaft end 126 may be located adjacent the exhaust end 500 or hot side of gas turbine engine 100 and second shaft end 121 may be located adjacent the inlet end 110 or cold side of gas turbine engine 100.

Gas turbine engine 100 includes a cold side power output coupling 620 and a hot side power output coupling 625, located at opposite ends of gas turbine engine 100. Cold side power output coupling 620 may be located adjacent the inlet end 110 of the gas turbine engine 100, while hot side power output coupling 625 may be located adjacent the exhaust end 500. Cold side power output coupling 620 may be located at second shaft end 121 and hot side power output coupling 625 may be located at first shaft end 126.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

Figure 2:
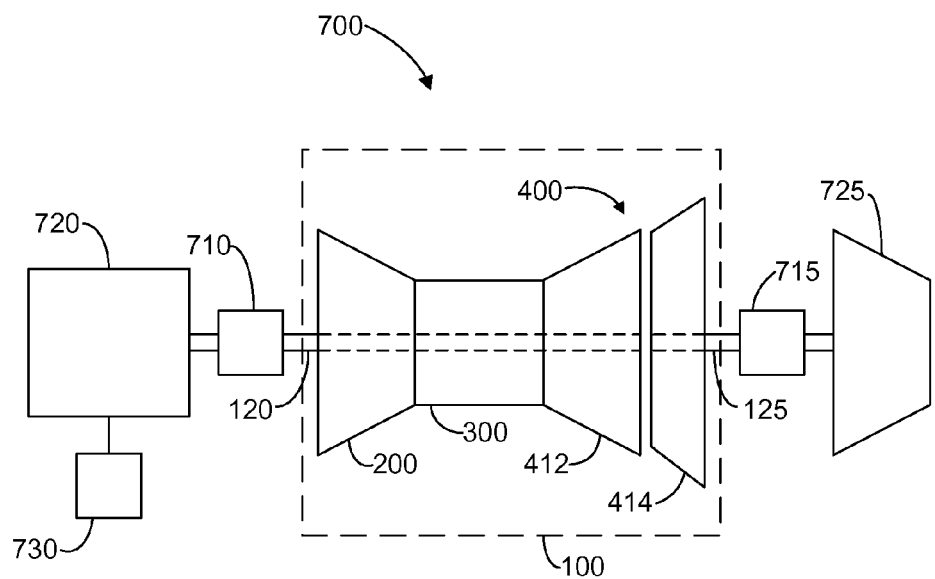
FIG. 2 is a schematic diagram of the gas turbine engine of FIG. 1 with driven equipment coupled to the gas turbine engine.

FIG. 2 is a schematic diagram of a gas turbine engine package 700 including the gas turbine engine 100 of FIG. 1 with driven equipment coupled to the gas turbine engine 100. In the embodiment illustrated, gas turbine engine package 700 includes gas turbine engine 100, electric generator 720, and gas compressor 725. Electric generator 720 is coupled to second shaft end 121 and gas compressor 725 is coupled to first shaft end 126. Other combinations of driven equipment, apparatuses, and mechanical drive packages coupled to first shaft end 126 and second shaft end 121 may also be used.

Gas turbine engine package 700 may also include hot side gearbox 715, cold side gearbox 710, and converter 730. Driven equipment and apparatuses such as electric generator 720 and gas compressor 725 may be coupled to first shaft end 126 and second shaft end 121 via a hot side gearbox 715 and a cold side gearbox 710. In some embodiments, cold side gearbox 710 is a constant speed drive ("CSD") gearbox to drive electric generator 720 when electric generator 720 is a synchronous generator. In other embodiments, converter 730 may be electrically connected to electric generator 720 between generator 720 and a power grid when electric generator 720 is a variable speed or non-synchronous generator.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, air 10 enters the inlet end110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet end 110 towards the exhaust end 500). Likewise, each turbine disk assembly may be associated with a numbered stage.

Once compressed air 10 leaves the compressor 200, it enters the combustor 300, where it is diffused and mixed with fuel. The mixed air 10 and fuel are injected into the combustion chamber 390 via fuel injector 310 and combusted. Energy is extracted from the combustion reaction via the turbine 400. A first portion of the energy extracted is used by compressor 200 to compress air 10. The remainder or second portion of the energy extracted may be used to power a driven apparatus connected to second shaft end 121, such as electric generator 720, to power a driven apparatus connected to first shaft end 126, such as gas compressor 725, or may be used to power the driven equipment connected to both first shaft end 126 and second shaft end 121 concurrently.

Exhaust gas 90 may then be diffused in exhaust diffuser 520, collected and redirected. Exhaust gas 90 exits the system via an exhaust collector 550 and may be further processed (e.g., to reduce harmful emissions, and/or to recover heat from the exhaust gas 90).

Generally a driven apparatus is connected to either a cold end drive or a hot end drive. When the driven apparatus is operated below a full load for the gas turbine engine, the gas turbine engine may operate at a partial load. Gas turbine engines are generally designed to operate most efficiently when fully loaded or when at a predetermined set point. Opearating a gas turbine engine at full load or at the predetermined set point may allow operation at peak efficiency and may reduce emissions.

Figure 3:
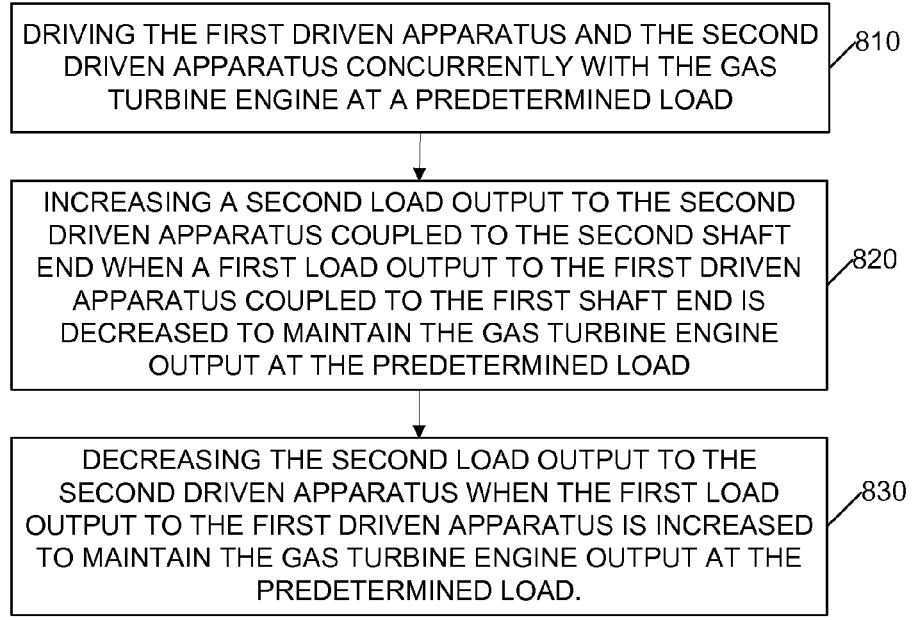
FIG. 3 is a flowchart for a method of operating the gas turbine engine of FIG. 1.

Mechanically coupling a first driven apparatus to the first shaft end 126 at one end of gas turbine engine 100 and a second driven apparatus to the second shaft end 121 at the opposite end of gas turbine engine 100 may allow constant operation of gas turbine engine 100 at a full load or at a predetermined set point. FIG. 3 is a flowchart for a method of operating the gas turbine engine of FIG. 1. The method includes driving the first driven apparatus and the second driven apparatus concurrently with the gas turbine engine at a predetermined set point at step 810. The predetermined set point may be a full load.

In the embodiment illustrated in FIG. 2, the first driven apparatus is gas compressor 725 coupled to hot side power output coupling 625 which is coupled to the hot end drive or power turbine section 414, and the second driven apparatus is electric generator 720 coupled to cold side power output coupling 620 which is coupled to the cold end drive or gas producer section 412.

The method also includes increasing a second load output to the second driven apparatus coupled to the second shaft end when a first load output to the first driven apparatus coupled to the first shaft end is decreased to maintain the gas turbine engine output at the predetermined set point at step 820. When the load demand of the first driven apparatus drops below the predetermined set point of gas turbine engine 100, the load demand of the second driven apparatus may be raised to maintain the combined load demand of the first and second driven apparatuses at the predetermined set point of the gas turbine engine 100, which may maintain peak efficiency operation of gas turbine engine 100.

The method further includes decreasing the second load output to the second driven apparatus when the first load output to the first driven apparatus is increased to maintain the gas turbine engine output at the predetermined set point at step 830. When the load demand of the first driven apparatus is increased, the load demand of the second driven apparatus may be decreased to maintain the combined load demand of the first and second driven apparatuses at the predetermined set point of the gas turbine engine 100, which may maintain peak efficiency operation of gas turbine engine 100.

In the embodiment illustrated in FIG. 2, increasing and decreasing the load output to the first driven apparatus includes increasing and decreasing the power turbine section 414 power output respectively, and increasing and decreasing the load output to the second driven apparatus includes increasing and decreasing the gas producer section 412 load output respectively.

During operation, an increase in the power turbine section 414 power output may require an increase in speed of gas producer shaft 120, while simultaneously decreasing the gas producer section 412 load output or vice versa. The gas producer section 412 load output may be adjusted by modifying the torque applied to gas producer shaft 120. This may be accomplished at cold side gearbox 710 or at the driven apparatus, such as electric generator 720. For example, cold side gearbox 710 may be a CSD gearbox. With a CSD gearbox, a torque may be applied by cold side gearbox 710 when gas producer shaft 120 slows down.

Some driven equipment, such as gas compressor 725 or a pump, may be operated at a wide range of speeds. It may be desirable to couple such equipment to power turbine shaft 125 at first shaft end 126. Power turbine section 414 may operate at a wide range of speeds, such as from forty to one-hundred percent.

Some driven equipment, such as electric generators, may operate more effectively at constant speeds. It may be desirable to couple such equipment to gas producer shaft 120 at second shaft end 121. Gas producer section 412 may operate at a narrow range of speeds, such as from eighty to one-hundred percent. When cold side gearbox 710 is a CSD gearbox, electric generator 720 may be a synchronous generator and may match the power frequency supplied to a power grid.

When cold side gearbox 710 is not a CSD gearbox, the power output frequency produced by electric generator 720 may not be synchronous to or match the power frequency used by the power grid. A non-synchronous frequency may result in damage to electric generator 720 or cause problems for electrical users. As such, converter 730 may be coupled between electric generator 720 and the power grid to modify the power output frequency of electric generator 720 to a synchronous frequency or to match the power frequency used by the power grid. For example, converter 730 may be configured to modify the power output frequency to a 50 Hz power output for applications in Europe or may be configured to modify the power output frequency to a 60 Hz power output for applications in the United States. For example, converter 730 may be a variable to constant frequency converter.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes a particular gas turbine engine, it will be appreciated that the gas turbine engine in accordance with this disclosure can be implemented in various other configurations. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A gas turbine engine, comprising:
   a compressor including
      a compressor rotor assembly including a plurality of compressor disk assemblies;
   a combustor adjacent the compressor;
   a turbine adjacent the combustor, the turbine including
      a turbine rotor assembly including
         a power turbine section with a first turbine disk assembly, and
         a gas producer section with a second turbine disk assembly;
   a power turbine shaft coupled to the power turbine section, the power turbine shaft being configured to couple to a first driven apparatus; and
   a gas producer shaft coupled to the compressor rotor assembly and the gas producer section, the gas producer shaft being configured to couple to a second driven apparatus.

2. The gas turbine engine of claim 1, further comprising a gas compressor coupled to the power turbine shaft.

3. The gas turbine engine of claim 1, further comprising an electric generator coupled to the gas producer shaft.

4. The gas turbine engine of claim 2, further comprising an electric generator coupled to the gas producer shaft.

5. The gas turbine engine of claim 3, further comprising a converter connected to the electric generator output.

6. The gas turbine engine of claim 5, wherein the converter is a variable to constant frequency converter.

7. The gas turbine engine of claim 5, wherein the converter outputs a constant frequency of 60 hertz.

8. The gas turbine engine of claim 3, further comprising a cold side gearbox coupling the gas producer shaft to the electric generator, the cold side gearbox being a constant speed drive.

9. A gas turbine engine package, comprising:
a first driven apparatus;
a second driven apparatus; and
a gas turbine engine including
- a compressor including
  - a compressor rotor assembly including a plurality of compressor disk assemblies,
- a turbine including
  - a turbine rotor assembly including
    - a power turbine section with a first turbine disk assembly, and
    - a gas producer section with a second turbine disk assembly,
- a power turbine shaft coupled to the power turbine section and to the first driven apparatus, and
- a gas producer shaft coupled to the compressor rotor assembly, the gas producer section, and the second driven apparatus.

10. The gas turbine engine package of claim 9, wherein the first driven apparatus is a gas compressor.

11. The gas turbine engine package of claim 9, wherein the second driven apparatus is an electric generator.

12. The gas turbine engine package of claim 10, wherein the second driven apparatus is an electric generator.

13. A gas turbine engine package of claim 11, further comprising:
a converter connected to the electric generator output.

14. The gas turbine engine package of claim 13, wherein the converter is also connected to a power grid.

15. The gas turbine engine package of claim 9, wherein the first driven apparatus couples to the power turbine shaft via a hot side gearbox and the second driven apparatus couples to the gas producer shaft via a cold side gearbox.

16. A method for operating a gas turbine engine including an inlet end, a compressor including a compressor rotor assembly with a plurality of compressor disk assemblies adjacent the inlet end, a combustor adjacent the compressor, a turbine including a turbine rotor assembly with a plurality of turbine disk assemblies adjacent the combustor, an exhaust end adjacent the turbine, a first shaft end adjacent the exhaust end and coupled to at least one of the plurality of turbine disk assemblies and a first driven apparatus, and a second shaft end adjacent the inlet end and coupled to the compressor rotor assembly, at least one of the plurality of turbine disk assemblies, and a second driven apparatus, the first shaft end and the second shaft end being located at opposite ends of the gas turbine engine, the method comprising:
- driving the first driven apparatus and the second driven apparatus concurrently with the gas turbine engine at a predetermined load;
- increasing a second load output to the second driven apparatus coupled to the second shaft end when a first load output to the first driven apparatus coupled to the first shaft end is decreased to maintain the gas turbine engine output at the predetermined load; and
- decreasing the second load output to the second driven apparatus when the first load output to the first driven apparatus is increased to maintain the gas turbine engine output at the predetermined load.

17. The method of claim 16, further comprising:
converting an electrical output of the second driven apparatus to a frequency synchronous to a power grid with a converter, wherein the second driven apparatus is an electric generator and the converter is connected to the electric generator and the power grid.

18. The method of claim 16, further comprising:
rotating a power turbine shaft including the first shaft end at a first speed; and
rotating a gas producer shaft including the second shaft end at a second speed;
wherein the power turbine shaft is coupled to a power turbine section of the turbine, and the gas producer shaft is coupled to the compressor rotor assembly and to a gas producer section of the turbine.

19. The method of claim 16, wherein increasing and decreasing the second load output includes increasing and decreasing an output to an electric generator, and increasing and decreasing the first load output includes increasing and decreasing an output to a gas compressor.

20. The method of claim 16, wherein increasing the second load output to the second driven apparatus coupled to the second shaft end when the first load output to the first driven apparatus coupled to the first shaft end is decreased to maintain the gas turbine engine output at the predetermined load and decreasing the second load output to the second driven apparatus when the first load output to the first driven apparatus is increased to maintain the gas turbine engine output at the predetermined load each include maintaining the gas turbine engine at a full load.

* * * * *